Figure 1:
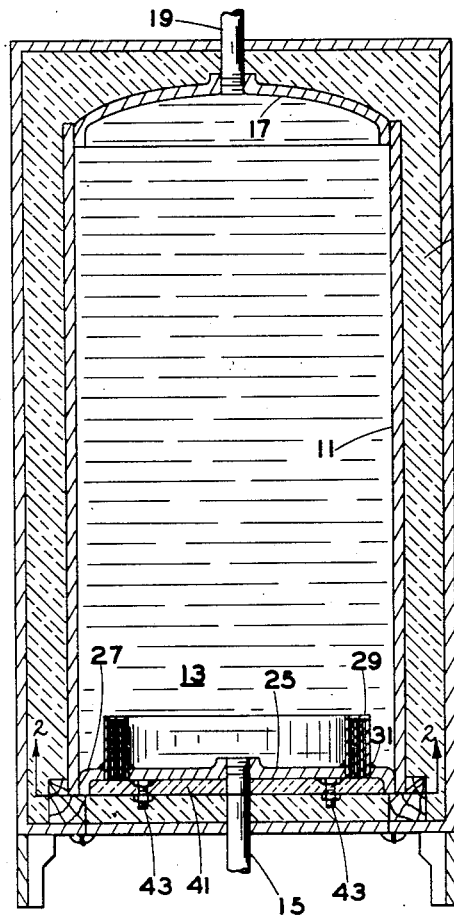

Dec. 14, 1948.  C. M. OSTERHELD  2,456,143

WATER HEATER

Filed Nov. 19, 1946

INVENTOR.
CLARK M. OSTERHELD
BY
ATTY

Patented Dec. 14, 1948

2,456,143

UNITED STATES PATENT OFFICE 2,456,143

WATER HEATER

Clark M. Osterheld, Stoughton, Wis., assignor to McGraw Electric Company, Elgin, Ill., a corporation of Delaware Application November 19, 1946, Serial No. 710,776

2 Claims. (Cl. 219—39)

My invention relates to electric heaters and particularly to electric water heaters for hot water tanks.

An object of my invention is to provide a relatively simple and novel form of electric heater for hot water tanks.

Another object of my invention is to provide an electric water heater located in a recess in the bottom closure member of a tank.

Another object of my invention is to provide an electric water heater that shall rely on an integral electric-insulating coating on the resistor for insulation.

Other objects of my invention will either be apparent from a description of several forms of device embodying my invention or will be set out in the course of such description and be particularly pointed out in the appended claims.

Figure 2:
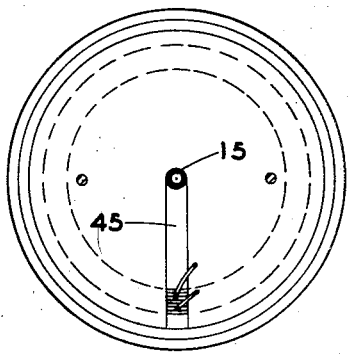
Figure 3:
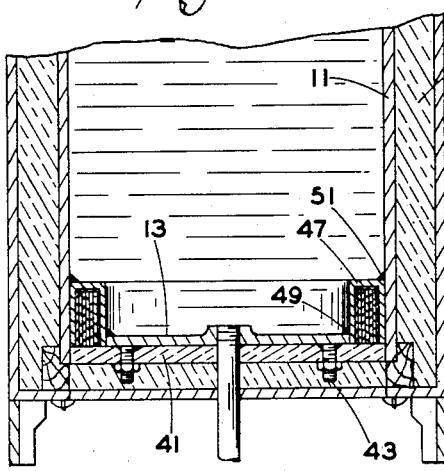
Figure 4:
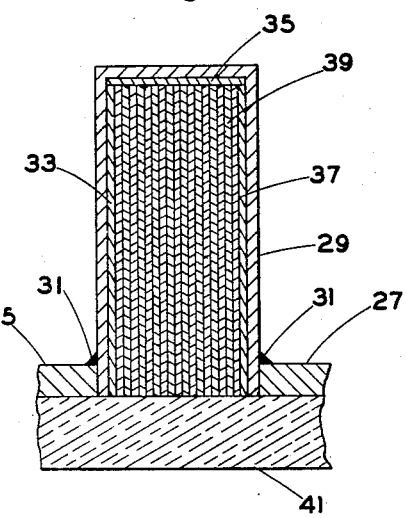

In the drawings:

Figure 1 is a view in vertical section through a standard domestic hot water tank having a heater associated therewith embodying my invention, Fig. 2 is a sectional view therethrough taken on the line 2—2 of Fig. 1, Fig. 3 is a fragmentary view in vertical section through a standard hot water tank embodying a modified form of heater according to my invention, and, Fig. 4 is a sectional view through the heater shown on an enlarged scale.

Referring first of all to Fig. 1 of the drawings, I have there shown a standard domestic hot water tank 11, having a lower closure member 13 which is provided with a cold water inlet pipe 15. I provide also an upper closure member 17 which is provided with a hot water outlet pipe 19. Tank 11 may be surrounded by a mass 21 of heat insulation, such as mineral wool, which is held in proper operative position around tank 11 by an outer casing 23.

The lower closure member 13 consists of a central portion 25 and an outer annular portion 27, these two portions being welded to a recess member 29 as by a pair of welding seams 31. The thickness of the wall of recess member 29 is made as small as possible and the material of recess member 29 should have as great a heat conductivity as it may be possible to obtain.

The inside surface of the walls of recess member 29 has located adjacent thereto strips 33, 35 and 37 of a relatively light weight metal such as aluminum, which has a relatively very high heat conductivity. The thickness of members 33, 35 and 37 may be on the order of .035" although the thickness of these members may vary from .03" to .04".

I provide a resistance conductor 39 which is preferably in the shape of a strip of pre-determined thickness and a width such that the lower edge will be even with the outer surface of lower closure members 25 and 27. While I may use a resistance conductor of the same general kind as is now used for resistance conductors I prefer to use an aluminum resistance conductor the outer surface of which has thereon an integral, inorganic, heat-conducting, high-temperature-resisting and electric-insulating coating, the thickness of this coating being on the order of .001". While I have set forth a specific thickness for such coating I do not desire to be limited thereto since the thickness of such coating may vary from .0005" to .0015". While I have not set forth any number of helically wound turns of the resistance strip 39 the thickness of such strip will be made upon calculation of the amount of space available for its reception between the liners 33 and 37 and the amount of energy to be translated into heat in the resistor.

I provide a disc 41 of preferably solid heat-insulation which is adapted to be held tightly against the lower surface of the lower closure member as by a pair of bolts 43. As an example, disc 41 may consist of asbestos lumber having a radial slot 45 therein so that it may be placed in proper operative position to be held by nuts applied to bolts 43.

Referring now to Fig. 3 of the drawings, I have there shown a modification of structure in which a recess member 47, to receive the resistance conductor, is positioned at the outer edge of lower closure member 13, being secured to said closure member as by a welding seam 49, a welding seam 51 being used to ensure watertight engagement between the recess member 47 and the outer peripheral wall of tank 11. Substantially the same comments made hereinbefore with regard to the resistance conductor 39, having on its entire outer surface an integral coating, which integral coating may be applied according to the process set forth in United States Patent #1,526,127, apply also here. Substantially the same structure of a heat insulating disc 41 and its method of holding are applicable here also.

The liners 33, 35 and 37, preferably made of relatively thin aluminum, may also have over their entire outer surface the same kind of coating as is used on resistance conductor 39, and if the voltage to which the resistance conductor is to be connected is higher than say 110 volts, I provide such coating on not only the resistance conductor but also on the spacing strips 33, 35 and 37.

The structure shown more particularly in Fig. 1 of the drawings provides a novel form of heating element, three sides of which are in direct engagement with the water in the tank, whereby it is possible to design a heater capable of translating a relatively large amount of electrical energy into heat without endangering the safety of the electric insulation provided on the conductor as well as on the liners positioned between the conductor and the recess member 29.

The use of an integral, inorganic coating on the resistor and the use of relatively thin liners, which may also have a coating thereon, provides a minimum thickness through which the heat generated by the resistor must travel before it reaches the water, which it is designed to heat.

Various modifications may be made in the device embodying my invention without departing from the spirit and scope thereof and I desire that all such modifications coming clearly within the scope of the appended claims shall be considered a part of my invention.

I claim as my invention:

1. In combination, a water tank having in the bottom wall thereof an annular recess of uniform width and depth, a heating element in said recess comprising a sheet-metal resistor and a layer of electric-insulating material wound together into a tight spiral with successive turns in firm contact, and thin metal sheets having electric-insulating layers thereon lining said recess, said wound resistor and metal sheets filling said recess and fitting snugly therein.

2. The combination of the immediately preceding claim wherein said resistor and said lining sheets comprise aluminum and wherein the electric-insulating layers thereon are inorganic, integral, heat-conducting, and high-temperature-resisting and comprise oxidation products of aluminum.

CLARK M. OSTERHELD.

REFERENCES CITED

The following references are of record in the file of this patent:

UNITED STATES PATENTS

| Number | Name | Date |
|---|---|---|
| 519,043 | Jenkins | May 1, 1894 |
| 1,117,240 | Presser | Nov. 17, 1914 |
| 1,746,522 | Carleton | Feb. 11, 1930 |
| 1,934,958 | White | Nov. 14, 1933 |
| 1,996,625 | Pendleton | Apr. 2, 1935 |
| 2,357,906 | Osterheld | Sept. 12, 1944 |